United States Patent [19]

Okayama

[11] Patent Number: 4,570,498
[45] Date of Patent: Feb. 18, 1986

[54] DIFFERENTIAL PRESSURE MEASURING TRANSDUCER ASSEMBLY

[75] Inventor: Tsutomu Okayama, Katsuta, Japan

[73] Assignee: Hitachi, Ltd., Tokyo, Japan

[21] Appl. No.: 599,190

[22] Filed: Apr. 11, 1984

[51] Int. Cl.⁴ .............................................. G01L 7/08
[52] U.S. Cl. ..................................... 73/720; 73/726; 338/4
[58] Field of Search ................ 73/720, 721, 726, 727; 338/4, 42

[56] References Cited

U.S. PATENT DOCUMENTS

| 2,979,680 | 4/1961 | Bean, Jr. | 73/720 X |
| 3,213,400 | 10/1965 | Gieb | 73/720 X |
| 3,869,906 | 3/1975 | Andersson | 338/4 X |
| 4,141,253 | 2/1979 | Whitehead | 338/42 X |
| 4,321,578 | 3/1982 | Nayasu et al. | 73/721 X |
| 4,364,276 | 12/1982 | Shimazoe et al. | |

FOREIGN PATENT DOCUMENTS 2122027  1/1984  United Kingdom .

Primary Examiner—Herbert Goldstein
Attorney, Agent, or Firm—Antonelli, Terry & Wands

[57] ABSTRACT

A differential pressure measuring transducer assembly of semiconductor material including a pressure receiving section producing a displacement when pressure is applied, and a stationary section of large thickness located at an outer periphery of the pressure receiving section. The pressure receiving section is composed of a large thickness portion extending to the stationary section at the outer periphery, and a small thickness portion occupying the rest of the pressure receiving section, and a gauge resistance is provided to the large thickness portion.

6 Claims, 11 Drawing Figures

DIFFERENTIAL PRESSURE MEASURING TRANSDUCER ASSEMBLY

BACKGROUND OF THE INVENTION

1. Field of the Invention

This invention relates to a differential pressure measuring transducer assembly using a measuring diaphragm of semiconductor material for measuring a differential pressure between two fluids by converting the differential pressure into a strain and detecting the strain as a variation or change in electrical resistance.

2. Description of the Prior Art

In one type of measuring diaphragm of semiconductor material, such as silicon, for measuring a differential pressure, the diaphragm having a center area and a peripheral area of large thickness and an intermediate area of small thickness as disclosed in U.S. Pat. No. 4,364,276, for example, includes a strain producing portion disposed in the small thickness intermediate area in which a gauge resistance is provided by a dispersion method or an ion implantation method. This type of measuring diaphragm offers the advantage that substantially the same characteristics can be obtained even if the pressure is applied in different directions (whether the pressure is applied on the gauge surface or on the opposite side).

However, this type of measuring diaphragm suffers the disadvantage that the linearity of the pressure and output deteriorates when the pressure differential between a fluid under high pressure and a fluid under low pressure being measured is very small. This phenomenon is accounted for by the fact that, although it is necessary to further reduce the thickness of the small thickness area of the measuring diaphragm to effectively carry out measurements in the low pressure differential range, a reduction in thickness produces a deflection in the small thickness area, resulting in the production of what is usually referred to as a balloon effect in the measuring diagram in which the central area thereof expands.

SUMMARY OF THE INVENTION

This invention has as its object the provision of a differential pressure measuring transducer assembly having a measuring diaphragm of semiconductor material which enables linearity of pressure and output to be obtained when a pressure difference of very small magnitude is measured.

The outstanding characteristic of the invention is that the pressure receiving section of the measuring diaphragm in which a gauge resistance is provided and a displacement occurs when pressure is applied is composed of a large thickness portion extending to the stationary section at the outer periphery of the measuring diaphragm, and a small thickness portion occupying the rest of the pressure receiving section, with the gauge resistance being located at the large thickness portion. The small thickness portion has the function of ensuring that the range of displacements is increased, and the large thickness portion has a sufficiently large thickness to avoid the occurence of the balloon effect. Owing to this outstanding characteristic, the invention is capable of increasing the range of displacements of the pressure receiving section when pressure is applied while avoiding the occurrence of the balloon effect due to the presence of the large thickness portion, so that linearity of pressure and output is ensured when measurements are made in the low pressure differential range.

DESCRIPTION OF THE PREFERRED EMBODIMENT

Figure 1:
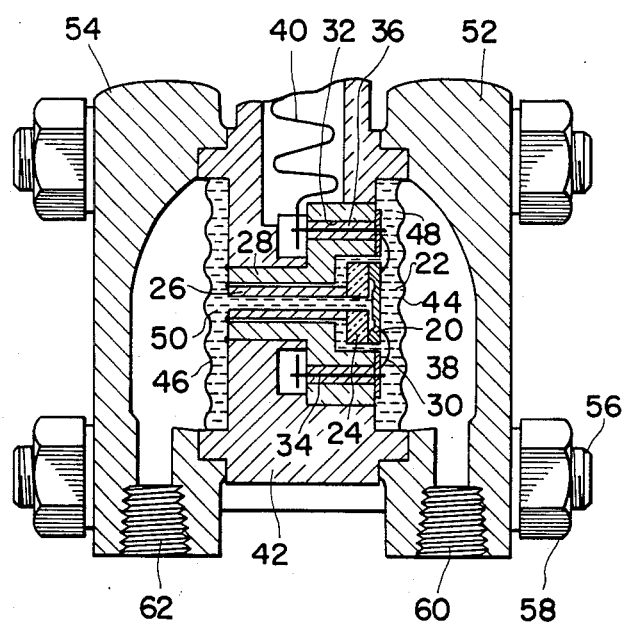
FIG. 1 is a fragmentary vertical sectional view of the differential pressure measuring transducer assembly in accordance with one embodiment of the invention.

FIG. 1 shows one embodiment of the differential pressure measuring transducer assembly in conformity with the invention comprising a measuring diaphragm 20 of semiconductor material having a gauge resistance. The measuring diaphragm 20 which is supported by a support block 28 formed of stainless steel through an annular glass washer 24 and a metal fixture 26 of hollow cylindrical shape extends into a pressure measuring chamber 22. The glass washer 24 and metal fixture 26 are formed of materials having substantially the same coefficients of thermal expansion as silicon. To be more specific, the glass washer 24 is formed of borosilicate glass and the metal fixture 26 is formed of iron-nickel or iron-nickel-cobalt alloy. The measuring diaphragm 20 is joined to the glass washer 24 by anodic bonding, and the glass washer 24 is joined to the metal fixture 26 also by anodic bonding while the metal fixture 26 is joined to the support block 28 by arc welding. The support block 28 has a printed substrate 30 of doughnut shape formed of ceramics which is substantially flush with the measuring diaphragm 20. The printed substrate 30 is held in position by conductors 34 to which it is joined by soldering, each of the conductors 34 extending through the associated one of a plurality of apertures 32 formed at the support block 28 on the same circumference and oriented in the direction of a center axis of the support block 28 and supported by a hermetic seal 36 provided to each of the apertures 32. The printed substrate 30 is connected through conductors 38 to the gauge resistance 74 (see FIG. 3) of the measuring diaphragm 20 which includes a plurality of resistance elements, and the conductors 34 supported by the hermetic seals 36 are connected to leads 40 for connection to outside. The support block 28 is joined by welding to a housing 42 to which a high-pressure-side diaphragm 44 and a low-pressure-side sealing diaphrgm 46 are secured by welding. A high-pressure-side sealed fluid 48 is held between one surface of the measuring diaphragm 20 and the high-pressure-side sealing diaphragm 44, and a low-pressure-side sealed fluid 50 is held between a surface of the measuring diaphragm 20 opposite the one surface and the low-pressure-side sealing diaphragm 46. Stated differently, the high-pressure-side sealed fluid 48 is separated from the low-pressure-side sealed fluid 50 by the measuring diaphragm 20. The sealed fluids are noncompressible insulating fluids and silicon oils are usually used as the sealed fluids. To minimize influences exerted by fluctuations in temperature, the high-pressure-side sealed fluid 48 and low-pressure-side sealed fluid 50 are rendered equal to each other in volume and their volume is reduced to a minimum essential level.

A high-pressure-side flange 52 and a low-pressure-side flange 54 are secured to opposite side surfaces of the housing 42 near four corners thereof by bolts 56 and nuts 58 in such a manner that the high-pressure-side flange 52 and low-pressure-side flange 54 enclose the high-pressure-side diaphragm 42 and low-pressure-side diaphragm 44, respectively. The high-pressure-side flange 52 is formed with a high-pressure fluid conducting passage 60 and the low-pressure-side flange 54 is formed with a low-pressure fluid conducting passage 62. One of the high-pressure fluid and low-pressure fluid may be at atmospheric or subatmospheric pressure.

Figure 2:
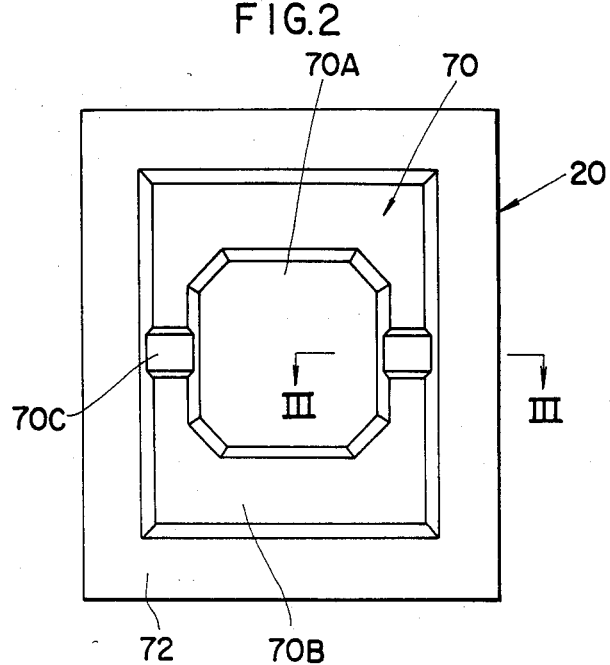
FIG. 2 is a bottom plan view of the measuring diaphragm.
Figure 3:
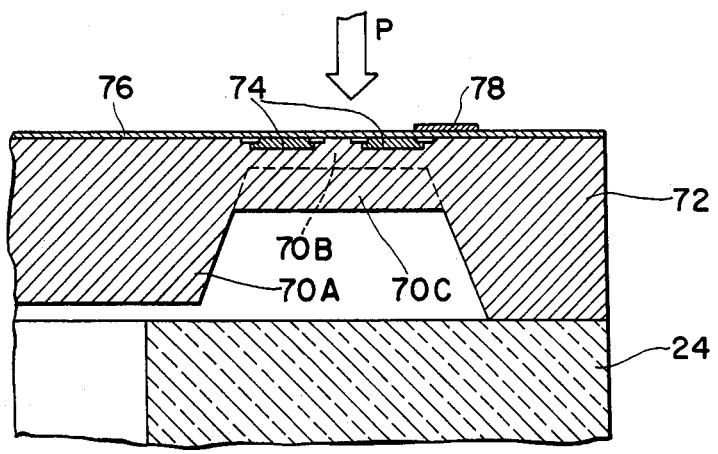
FIG. 3 is a sectional view, on an enlarged scale, taken along the line III—III in FIG. 2.
Figure 4:
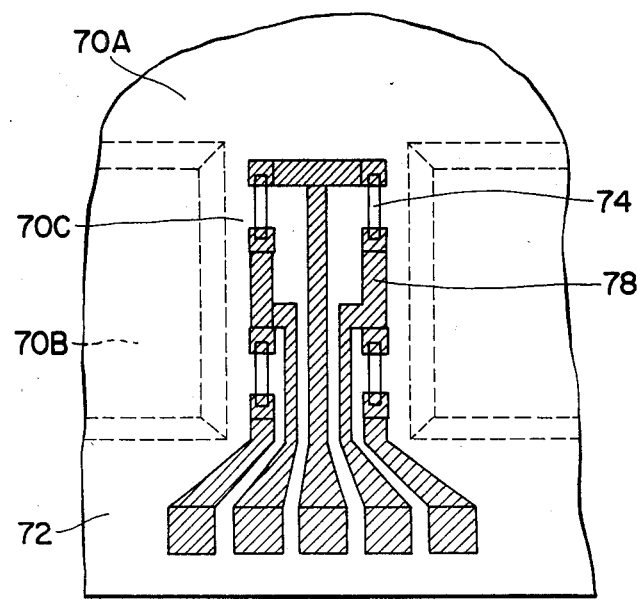
FIG. 4 is a fragmentary schematic view, shown on an enlarged scale, of the measuring diaghragm showing in detail the gauge resistance.

Referring to FIGS. 2-4, the measuring diaphragm 20 which consists of monocrystal silicon of the n-type having a {110} surface includes a pressure receiving section 70 tending to show a displacement when pressure is applied, and a stationary section 72 of large thickness located at an outer periphery of the pressure receiving section 70. The pressure receiving section 70 includes a rigid body portion 70A of large thickness located at its central portion, an annular small thickness portion 70B located at its outer periphery, and a pair of strain producing portions 70C each in the form of a beam extending between the rigid body portion 70A and the stationary section 72. The strain producing portions 70C of the beam shape have a thickness which is greater than that of the small thickness portion 70B but smaller than that of the rigid body portion 70A of large thickness and are located parallel to a <111> axis on the {110} surface in which sensitivity is maximized. The plurality of resistance elements of the p-type gauge resistance 74 are provided along the <111> axis by a diffusion method or ion plantation method. The gauge resistance elements 74 are located such that two resistance elements are located in the vicinity of the stationary section 72 at the outer periphery of the measuring diaphragm 20, and two resistance elements 74 are located in the vicinity of the rigid body portion 70A of large thickness in the central portion thereof, with the gauge resistance elements 74 being connected together in bridge connections of a Wheatstone form to produce an output when a differential pressure is produced. The measuring diaphragm 20 has at its surface an oxide film 76 for protecting the gauge resistance elements 74, and aluminum wires 78 connected to the gauge resistance elements 74 to take out the output of the gauge resistance elements 74.

As a fluid under pressure, such as a fluid to be processed, is introduced through the fluid conducting passage 60 in the high-pressure-side flange 52, the pressure of the fluid under high pressure is applied to one surface of the measuring diaphragm 20 through the high-pressure-side sealing diaphragm 44 and high-pressure-side sealed fluid 48. The pressure of a fluid under low pressure is applied to a surface of the measuring diaphrgm 20 opposite the one surface through the low-pressure-side sealing diaphragm 46 and low-pressure-side sealed fluid 50. As a result, the pressure receiving section 70 of the measuring diaphragm 20 is deflected toward the low pressure side in accordance with the differential pressure, thereby causing a change to take place in the resistance offered by the gauge resistance 74. This change in resistance is taken out via the aluminum wires 78, printed substrate 30 and conductors 34 and 40 to outside and the differential pressure is indicated.

More specifically, as pressure P is applied to the pressure receiving section 70 of the measuring diaphragm 20, the strain producing portions 70C are deflected. At this time, the small thickness portion 70B functions merely as an airtight seal providing film, and a force equal to the pressure P multiplied by a pressure receiving area A is exerted on the strain producing portions 70C. Thus, the strain producing portions 70C can be made to produce a strain with a high degree of efficiency.

A reaction balancing with the force exerted by the pressure P multiplied by the pressure receiving area A is governed by the reaction of the strain producing portions 70C. Thus, even if the thickness of the small thickness portion 70B shows a change, the strain produced shows no change if the thickness of the small thickness portion 70B is smaller than that of the strain producing portions 70C.

The rigidity S of the pressure receiving section 70 is given by $S \propto t^2 \times 1$ where t is the thickness of the small thickness portion, and l is the length of the periphery. When the strain producing portions are provided, the rigidity S' of the pressure receiving section is given by $S' \propto t^2(1-2w) + t_w^2 \times 2w$ where tw is the thickness of the strain producing portions, and w is the width thereof. Thus, if the thickness tw of the strain producing portions 70C is the same as the thickness of the small thickness portion of the prior art, the thickness t of the small thickness portion is 1/5 that of the strain producing portions and the width w of the strain producing portions is 1/20 the length l of its periphery, the rigidity of the pressure receiving section 70 can be reduced to about $\frac{1}{8}$, thereby enabling the sensitivity to be increased about eightfold.

In the invention, the strain producing portions 70C of the beam shape function as cantilevers that are connected together so that production of residual membrane stress can be neglected. Thus, it is possible to increase the width of the strain producing portions 70C without causing occurrences of nonlinear errors to increase due to the membrane stress production. Stated differently, the sensitivity can be increased several times by increasing the length of the beams supported at both ends, and the same sensitivity can be achieved even if the pressure receiving area of the measuring diaphragm is reduced.

Figure 5:
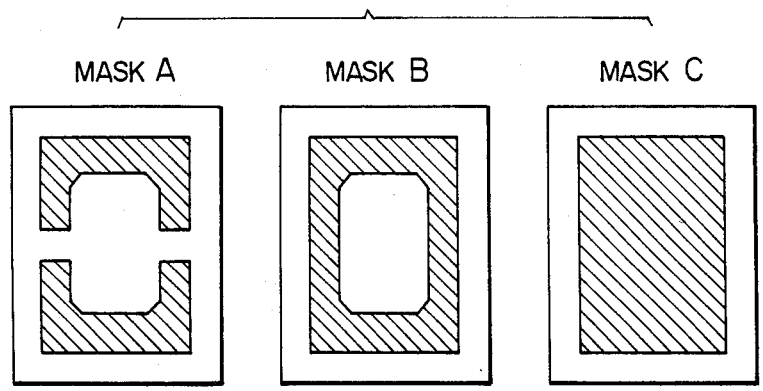
FIG. 5 shows mask patterns for performing etching on the measuring diaphragm.

FIG. 5 shows mask patterns used when the measuring diaphragm 20 shown in FIG. 2 is produced by etching. When an alkaline etching solution is used, the measuring diaphragm 20 is advantageously formed of monocrystal dilicon having a {100} surface.

First, a hatched region is etched by using a mask pattern A for an amount corresponding to the difference in thickness between the small thickness portion 70B and the strain producing portions 70C.

The mask used for performing etching may be either a photoresist or an oxide film produced by utilizing a photoresist.

Then, a mask patern B is used for etching the small thickness portion 70B and strain producing portions 70C. A mask pattern C is used for reducing the thickness of the rigid body portion 70A in the center of the pressure receiving section 70 below that of the stationary section 72. By using the masks of the type described, the risk of variations from one pattern to another being blurred by differences in thickness because non-etched regions have the original thickness of the substrate.

Figure 6A:
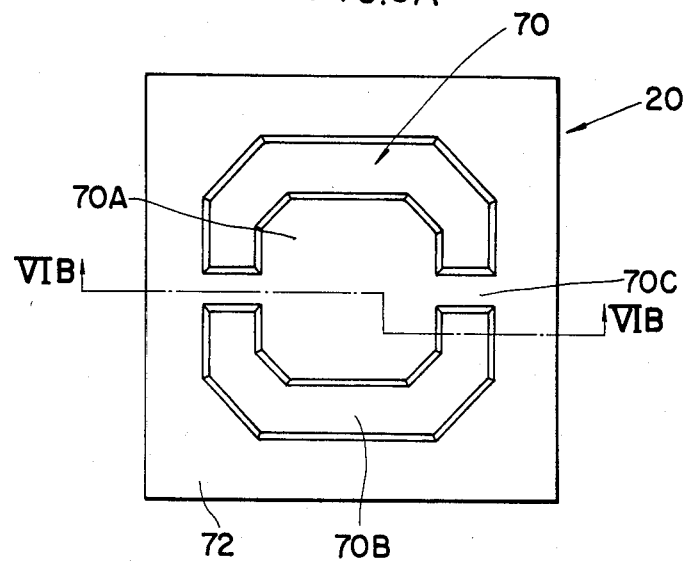
FIG. 6A is a top plan view of a modification of the measuring diaphragm shown in FIG. 2.
Figure 6B:
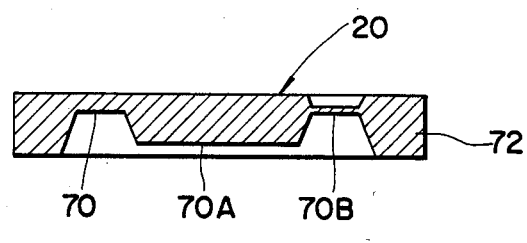
FIG. 6B is a sectional view taken along the line VIB—VIB in FIG. 6A.

FIGS. 6A and 6B shows a modification of the measuring diaphragm. FIG. 6A is a top plan view, and FIG. 6B is a sectional view taken along the line VIB—VIB in FIG. 6A.

As can be clearly seen in FIGS. 6A and 6B, etching is performed on both surfaces of the measuring diaphragm 20 to produce the small thickness portion 70B. As described hereinabove, the gauge resistance 74 is provided to the surface of the measuring diaphragm 20. Thus, by producing the small thickness portion 70B by performing etching on the surface of the measuring diaphragm 20, it is possible to positively determine the position of the strain producing portions 70C as seen from the surface, thereby facilitating the provision of the gauge resistance 74 to the surface of the measuring diaphragm 20.

Figure 7A:
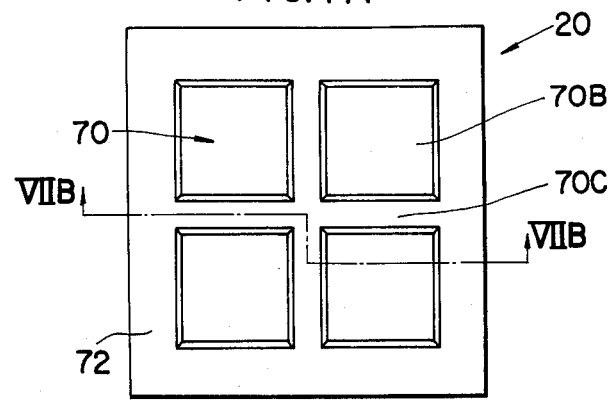
FIG. 7A is a top plan view of another modification of the measuring diaphragm shown in FIG. 2.
Figure 7B:
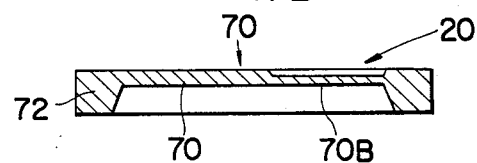
FIG. 7B is a sectional view taken along the line VIIB—VIIB in FIG. 7A.

FIGS. 7A and 7B show another modification of the measuring diaphragm. As shown, the pressure receiving section 70 is composed of small thickness portions 70B, and the strain producing portions 70C of the beam shape arranged in a crisscross form and no rigid body portion is provided to the central portion. The provision of the rigid body portion to the central portion of the measuring diaphragm offers the advantage of improving the characteristics. However, the presence of a rigid body portion in the center of the measuring diaphragm stands in the way of reducing the size of the measuring diaphragm. Thus, the construction shown in FIGS. 7A and 7B is advantageous when it is desired to obtain a compact size in a measuring diaphragm.

Figure 8A:
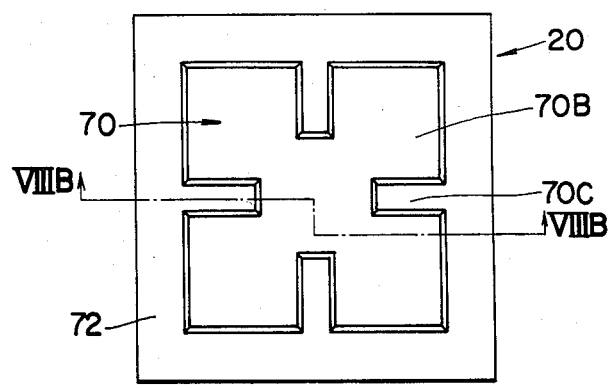
FIG. 8A is a top plan view of still another modification of the measuring diaphragm shown in FIG. 2.
Figure 8:
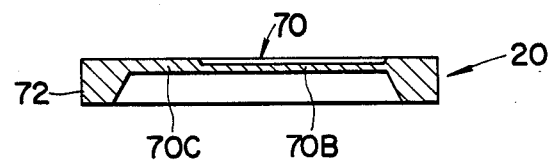
FIG. 8B is a sectional view taken along the line VIIIB—VIIIB in FIG. 8A.

FIGS. 8A and 8B show still another modification of the measuring diaphragm in which the strain producing portions 70C are each in the form of a cantilever supported at one end by the stationary section 72. In this construction, a greater displacement is produced by the strain producing portions 70C, thereby enabling measurements of differential pressures to be made in the range of very small differential pressures.

What is claimed is:

1. A differential pressure measuring transducer assembly comprising:
   a housing;
   a measuring diaphragm of semiconductor material mounted in said housing composed of a pressure receiving section producing a displacement when pressure is applied, and a stationary section located at an outer periphery of the pressure receiving section;
   means for causing a pressure of a fluid under pressure to act on the measuring diaphragm to measure the pressure;
   the pressure receiving section of the measuring diaphragm comprising at least one large thickness portion, and at least one small thickness portion, said at least one large thickness portion including a rigid body portion of large thickness located in a central portion and a plurality of strain producing portions in the form of beams located between the rigid body portion and the stationary section at the outer periphery of the pressure receiving section, said at least one small thickness portion including a small thickness portion located at an outer periphery of the rigid body portion, said strain producing portions in the form of beams having a thickness smaller than that of said rigid body portion and greater than that of the small thickness portion; and
   a gauge resistance provided in the vicinity of the large thickness portion.

2. A differential pressure measuring transducer assembly as claimed in claim 1, wherein said plurality of strain producing portions in the form of beams form a pair.

3. A differential pressure measuring transducer assembly as claimed in claim 1, wherein said small thickness portion of the pressure receiving section is formed by a recess in a gauge resistance surface and a recess in a surface opposite the gauge resistance surface.

4. A differential pressure measuring transducer assembly as claimed in claim 1, wherein said measuring diaphragm has its crystal surface on a {110} surface, and the gauge resistance is arranged parallel to a <111> axis.

5. A differential pressure measuring transducer assembly comprising:
   a housing;
   a measuring diaphragm of semiconductor material mounted in said housing composed of a pressure receiving section producing a displacement when pressure is applied, and a stationary section located at an outer periphery of the pressure receiving station;
   a high-pressure-side sealing diaphragm located between one surface of said measuring diaphragm and a fluid under high pressure;
   a high-pressure-side sealed fluid sealed between said high-pressure-side sealing diaphragm and said measuring diaphragm;
   a low-pressure-side sealing diaphragm located between a surface of said measuring diaphragm opposite said one surface and said measuring diaphragm;
   a low-pressure-side sealed fluid sealed between said low-pressure-side sealing diaphragm and said measuring diaphragm;
   the pressure receiving section of the measuring diaphragm comprising at least one large thickness portion, and at least one small thickness portion, said at least one large thickness portion including a rigid body portion of large thickness located in a central portion, and a plurality of strain producing portions in the form of beams located between the rigid body portion and the stationary section at the outer periphery of the pressure receiving section, said at least one small thickness portion including a small thickness portion located at an outer periphery of the rigid body portion, said strain producing portions in the form of beams having a thickness smaller than that of said rigid body portion and greater than that of the small thickness portion; and
   a gauge resistance provided in the vicinity of the large thickness portion.

6. A differential pressure measuring transducer assembly as claimed in claim 5, wherein said measuring diaphragm is supported in said housing through supporters formed of glass and metal.

* * * * *